United States Patent [19]

Giordano et al.

[11] Patent Number: 5,543,609
[45] Date of Patent: Aug. 6, 1996

[54] ARRANGEMENT FOR AND METHOD OF PROVIDING SHOCK PROTECTION AND VIBRATION ISOLATION FOR A SCAN MODULE

[75] Inventors: Joseph Giordano, Bayville; Frank Gong, Syosset; Richard Rizzo, New York; Hal Charych, East Setauket, all of N.Y.

[73] Assignee: Symbol Technologies, Inc., Bohemia, N.Y.

[21] Appl. No.: 330,687

[22] Filed: Oct. 28, 1994

[51] Int. Cl.$^6$ ................................................... G06K 7/10
[52] U.S. Cl. ..................... 235/462; 235/472; 361/685
[58] Field of Search ................................. 235/462, 472; 361/685; 248/635

[56] References Cited

U.S. PATENT DOCUMENTS

| | | | |
|---|---|---|---|
| 4,360,798 | 11/1982 | Swartz et al. | 235/463 X |
| 4,387,297 | 6/1983 | Swartz et al. | 235/472 |
| 4,409,470 | 10/1983 | Shepard et al. | 235/472 |
| 4,593,186 | 6/1986 | Swartz et al. | 235/472 |
| 4,603,262 | 7/1986 | Eastman et al. | 235/472 X |
| 4,758,717 | 7/1988 | Shepard et al. | 235/462 X |
| 4,760,248 | 6/1988 | Swartz et al. | 235/472 |
| 4,825,057 | 4/1989 | Swartz et al. | 235/462 X |
| 4,896,026 | 1/1990 | Krichever et al. | 235/472 |
| 4,964,017 | 10/1990 | Jindrick et al. | 361/685 X |
| 5,059,778 | 10/1991 | Zouzoulas et al. | 235/472 |
| 5,136,466 | 8/1992 | Remise et al. | 361/685 X |
| 5,140,144 | 8/1992 | Shepard et al. | 235/462 X |
| 5,262,627 | 11/1993 | Shepard | 235/472 |
| 5,264,956 | 11/1993 | Tzu-Chin | 235/462 X |
| 5,315,097 | 5/1994 | Collins, Jr. et al. | 235/472 |
| 5,333,098 | 7/1994 | DeLuca et al. | 361/685 |
| 5,475,206 | 12/1995 | Reddersen et al. | 235/462 |

*Primary Examiner*—Donald T. Hajec
*Assistant Examiner*—Steven Wigmore
*Attorney, Agent, or Firm*—Kirschstein, et al.

[57] ABSTRACT

A scan module is mounted in a frame within an electro-optical scanner. External shocks from the scanner to the frame are resisted by a plurality of shock mounts. Internal vibrations generated by the scan module are resisted from being transmitted to the frame by a plurality of isolation mounts. Printed circuit boards are mounted on the frame to make a compact, vibration-isolated, shock-protected assembly.

22 Claims, 5 Drawing Sheets

1

ARRANGEMENT FOR AND METHOD OF PROVIDING SHOCK PROTECTION AND VIBRATION ISOLATION FOR A SCAN MODULE

CROSS REFERENCE TO RELATED APPLICATIONS

This application is related to U.S. patent application Ser. No. 08/326,328, filed Oct. 20, 1994, and entitled "Compact Bar Code Scanning Module With Shock Protection."

BACKGROUND OF THE INVENTION

1. Field of the Invention

This invention generally relates to a scan module for use in an electro-optical scanner for reading indicia having parts of different light reflectivity such as bar code symbols and, more particularly, to an arrangement for, and a method of, providing shock protection and vibration isolation for the scan module.

2. Description of the Related Art

A bar code symbol scanner of the type exemplified, for example, by U.S. Pat. Nos. 4,251,798; 4,360,798; 4,369,361; 4,387,297; 4,593,186; 4,496,831; 4,409,470; 4,808,804; 4,816,661; 4,816,660; and 4,871,904, supports various electrical, mechanical and optical components in a scanner housing. These components are operative for directing a light beam from a light source onto a coded symbol for reflection therefrom. En route to the symbol, the light beam may be directed to, and reflected off, a movable scan mirror which is moved repeatedly by a drive component to cause the light beam to repeatedly scan the symbol. Light reflected off the symbol is collected by a collection optical component, and is directed to a detector component to generate an electrical symbol. Decode and microprocessor components are provided to decode the electrical symbol in accordance with an algorithm to generate data corresponding to the symbol being scanned.

In order to keep manufacturing costs down, improve reliability and facilitate the transfer of scanning technology to a variety of scanner housings of different shapes and sizes, it is known, for example, from U.S. Pat. No. 4,930,848 to assemble various electrical, mechanical and optical components on a distinct scan module, which can thereupon be positioned as a modular unit in a scanner housing. In order to protect the interior scan module from the impact of exterior shock forces externally applied to the housing, for example, if a user drops the housing or forcefully places the housing on a countertop, it is known to position relatively stiff, shock absorbers between individual components and the housing, as well as between interior support structures for the components and the housing. Although the known shock absorbers me generally satisfactory for their intended propose, as the scan modules and their components become smaller in size, lighter in weight and more energy efficient, these highly efficient, compact, lightweight scan modules, and their use of resonant and non-resonant components, become more prone to shock damage and optical misalignment.

Another related problem concerns vibration. The scan module, also known in the industry as a "scan engine," generates vibrations during scanning a symbol. Thus, the movable scan minor and its drive component create high frequency (on the order of 280 Hz) vibrations during scanning. These high frequency vibrations are not dampened by the prior art shock absorbers, but instead are propagated through the absorbers to the housing and, in the case of a hand-held housing, to the user's hand. Such vibrations are potentially irritating to the user who may find it uncomfortable to hold such a vibrating instrument, especially for prolonged periods of time.

SUMMARY OF THE INVENTION

OBJECTS OF THE INVENTION

It is a general object of this invention to provide vibration isolation and shock protection for the scan module.

Another object of this invention is to provide a scan module mounting arrangement which is highly resistant to external shocks and highly isolated from internal vibrations.

Still another object of this invention is to provide a vibration-resistant, shock-resistant scan module that can be installed in a variety of different scanner housings.

FEATURES OF THE INVENTION

In keeping with these objects and others which will become apparent hereinafter, one feature of this invention resides, briefly stated, in a mounting arrangement for, and a method of mounting, a scan module in a scanner for reading indicia, preferably an electro-optical scanner for reading bar code symbols of the Universal Product Code (UPC) type. The arrangement comprises a frame for supporting the scan module. Means are provided for shock mounting the frame within the screener to resist transmission of external shocks from the scanner to the frame. In accordance with this invention, means are also provided for vibration isolating the scan module from the frame to resist transmission of internal vibrations from the scan module to the frame.

In accordance with the preferred embodiment, the frame has side walls spaced apart of each other in mutual parallelism along a transverse direction, and a rear wall extending between the side walls along the transverse direction. The isolating means includes a plurality of isolation mounts spaced apart of one another and extending through the walls. Each wall has a passage extending therethrough, and each isolation mount includes an elastomeric sleeve in a respective passage, and an elongated fastener extending through the sleeve and passage to engage the scan module.

The shock mounting means includes a plurality of bumpers spaced apart of one another and exteriorly mounted on the walls of the frame. Each bumper is a block of elastomeric material having a predetermined hard elastomeric characteristic. Each sleeve of the isolation mounts is constituted of sponge rubber material having a soft elastomeric characteristic less than said predetermined characteristic. Thus, the "harder" bumpers serve as "stiff springs" to absorb external low frequency shocks from being transmitted from the housing to the scan module, and the "softer" sleeves of the isolation mounts serve as "soft springs" to resist propagation of rely vibrations internally generated by the scan module from reaching the housing.

For a compact construction, the frame is additionally provided with means for securing a generally planar, printed circuit board in an overlying relationship with the walls above the frame, as well as means for fixing another generally planar, printed circuit board in an overlying, generally parallel relationship with one of the side walls. Each printed circuit board carries electrical components of the type disclosed in the aforementioned patents, all of which have been assigned to the stone assignee as the present invention, and all of which are hereby incorporated by reference.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENT

Figure 4:
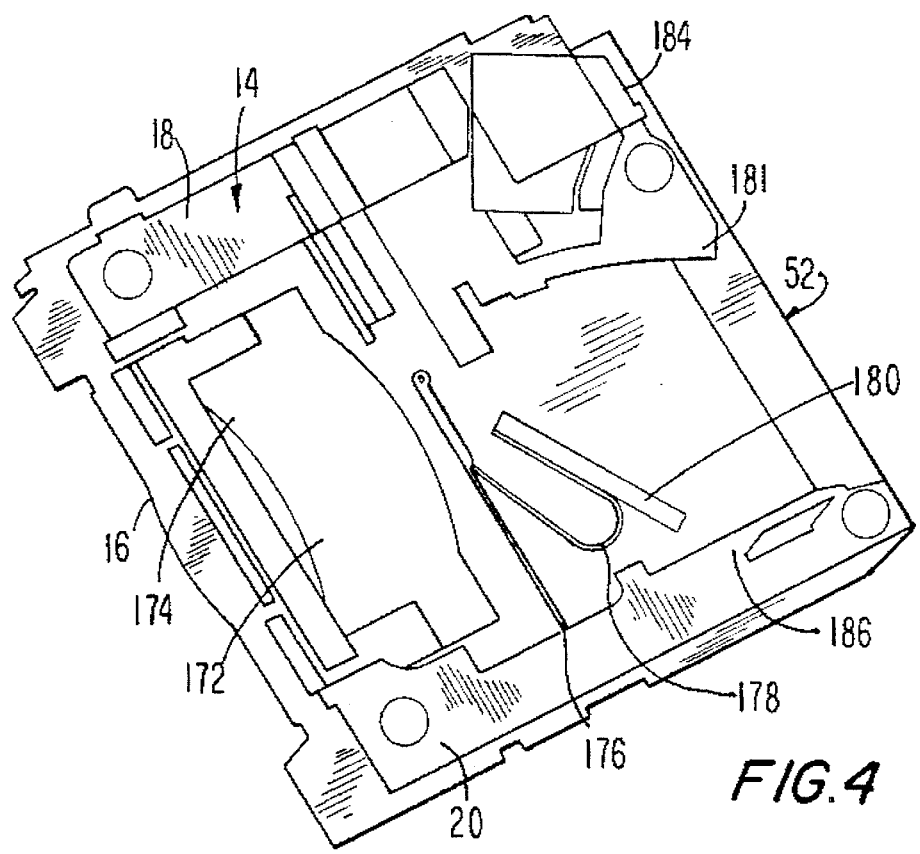
FIG. 4 is a bottom plan view of the scan module of FIG. 1.
Figure 5:
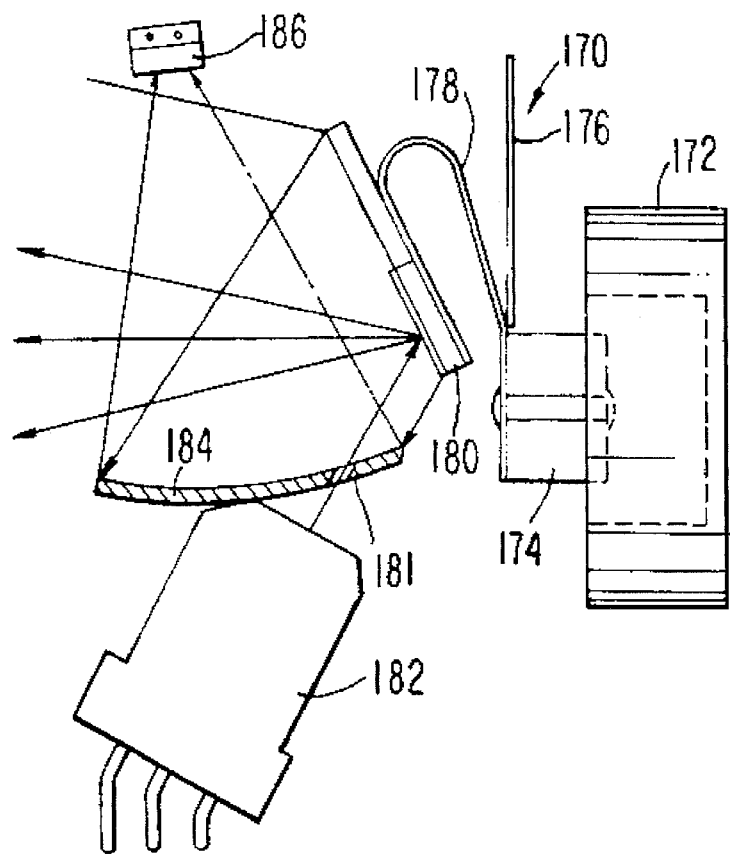
FIG. 5 is a schematic diagram showing details of the scanning components mounted in the scan module of FIG. 1.
Figure 6:
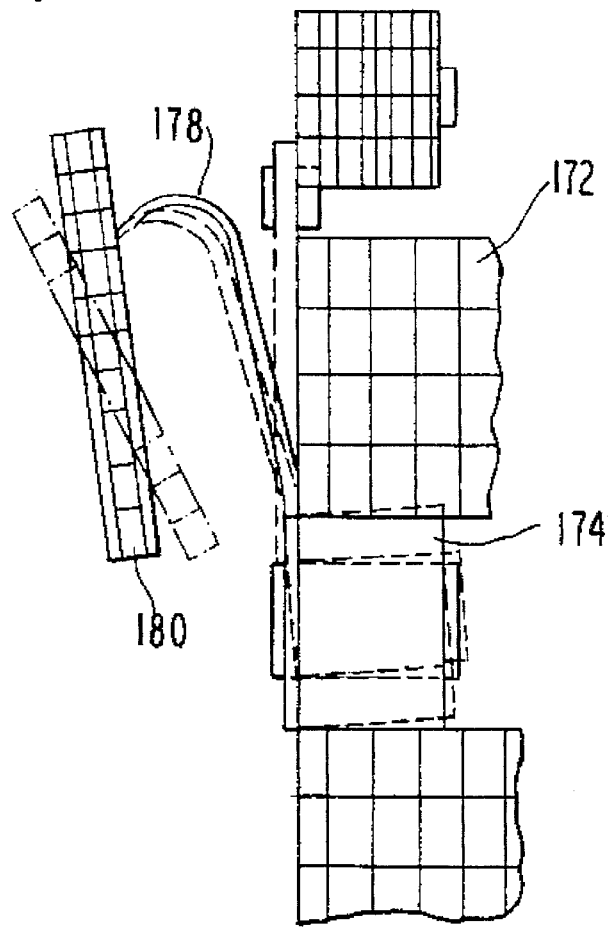
FIG. 6 is a partially broken-away, schematic view showing the rage of oscillation of the scanning component of FIG. 5.
Figure 7:
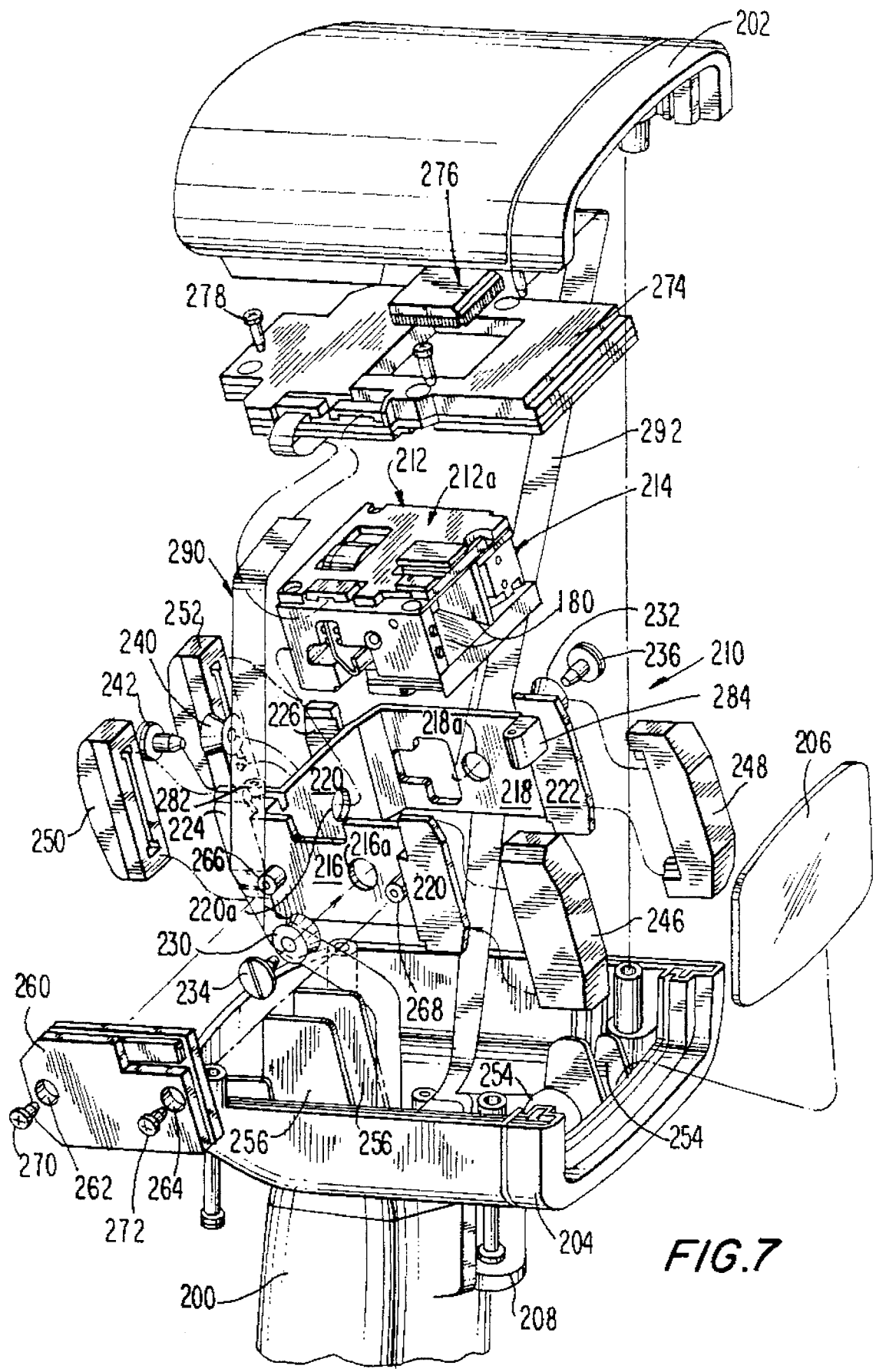
FIG. 7 is a front perspective, exploded view of a mounting arrangement in accordance with this invention for mounting the scan module of FIG. 1 in a hand-held scanner.
Figure 8:
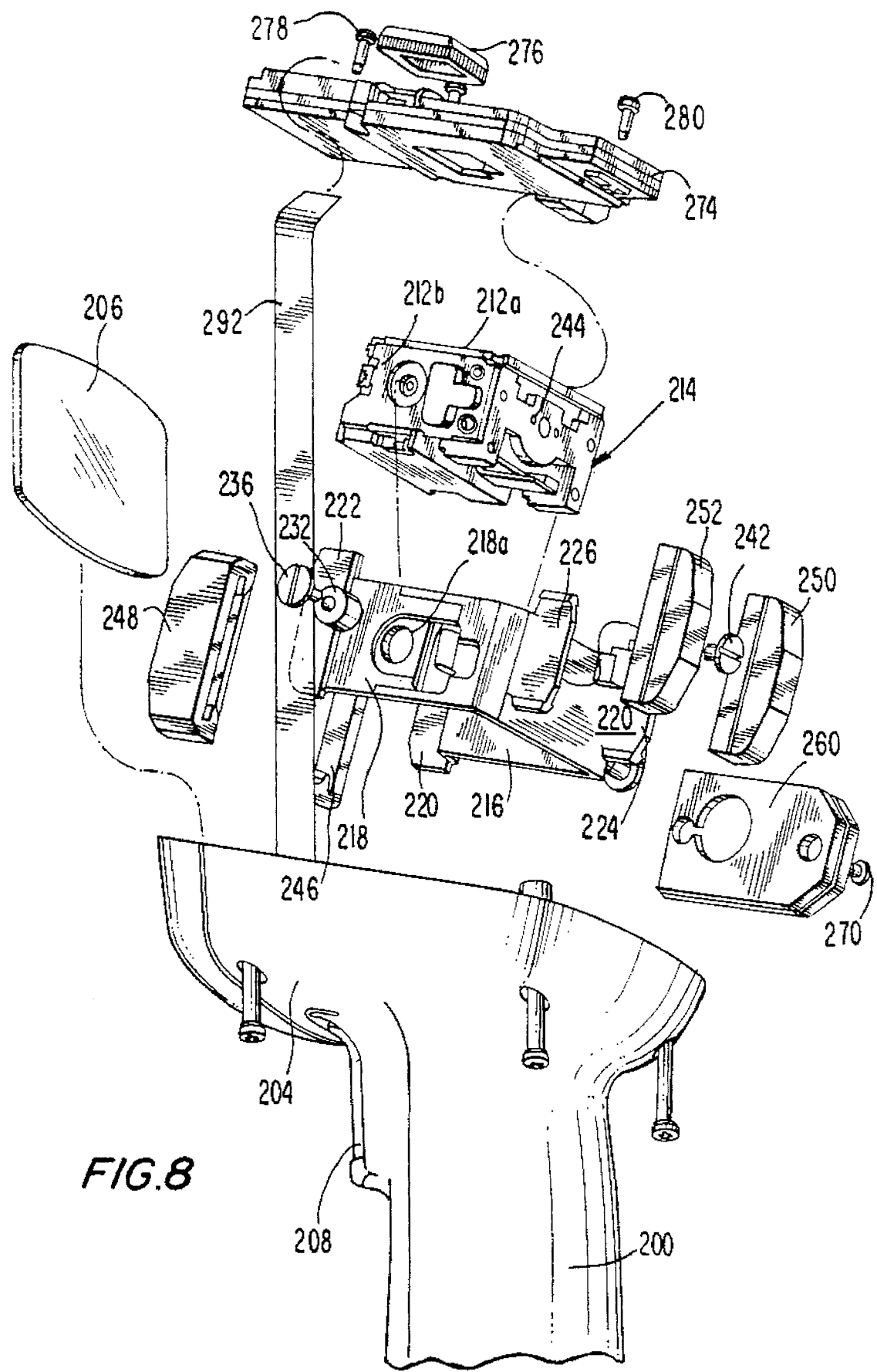
FIG. 8 is a rear perspective, exploded view of the arrangement of FIG. 7.

Reference will be initially made to FIGS. 5 and 6 which show, schematically, details of a preferred scanning arrangement. Reference will then be made to FIGS. 1 to 4 which show how the preferred scanning arrangement of FIGS. 5 and 6 is incorporated into a scan module. Reference will finally be made to FIGS. 7 and 8 which show how the scan module of FIGS. 1–4 is mounted in a hand-held scanner with the vibration-and shock-resistant arrangement in accordance with this invention.

Turning to FIG. 5, the scanning arrangement comprises an electromagnetic coil 172 having a central opening into which partially extends a permanent magnet 174. The coil 172 is rigidly secured to a support member (not shown), and the magnet 174 is resiliently coupled to the same support by means of an arm 176.

A U-shaped spring 178 is attached to the magnet 174 at one end, and the opposite end of the spring supports an optical element, preferably a reflector 180. Electrical leads (not shown) carry an energizing current or drive signal to the electromagnetic coil 172. The reflector 180 will oscillate in response to such electromagnetic coil signal so as to scan in one or two dimensions, selectively. The spring 178 may be made of any suitable flexible material, such as a leaf spring, a flexible metal coil or a flat bar having sufficient flexibility properties, and may be of a material such as a beryllium-copper alloy.

The reflector 180 is positioned between a laser beam source and lens assembly 182 and a target, i.e., a symbol (not shown). Between the reflector 180 and source 182 is a collector 184 having an opening 181 through which a light beam emitted by the laser source 182 passes to the reflector 180. The collector 184 is oriented so as to direct incoming light, reflected by reflector 180 and then collector 184, to a photodetector 186.

The mass of reflector 180 is considerably less than the mass of the magnet 174. The mass of the reflector 180 is selected to be less than about one-fifth the mass of the magnet 174, and the angle of vibration of the reflector as shown in FIG. 6, a diagram derived by computer simulation, is about seven times that of the magnet.

The reflector 180 is capable of two-dimensional scanning. As described in copending U.S. patent application Ser. No. 07/943,232, filed on Sep. 10, 1992, the U-shaped spring 178 may be formed of a plastic material, such as Mylar or Kapton. The arms of the U-shaped spring 178 and the planar spring 176 may be arranged to vibrate in planes which are orthogonal to each other. Mylar is a registered trademark of E. I. du Pont de Nemours and Co., Inc. for polyester material. Oscillatory forces applied to the magnet 174 by the electromagnetic coil 172 initiate desired vibrations in both of the springs 178 and 176 by carefully selecting drive signals applied to various terminals of the coil, as discussed in the copending application. Because of the different frequency vibration characteristics of the two springs 178 and 176, each spring will oscillate only at its natural vibration frequency. Hence, when the electromagnetic coil 172 is driven by a drive signal of high and low frequency components, the U-shaped spring will vibrate at a frequency in the high range of frequencies, and the planar spring 176 will vibrate at a frequency in a low range of frequencies.

A feature of the embodiment of FIG. 5 is that the laser beam emitted by source 182 impinges the reflector 180 at an angle that is orthogonal to the axis of rotation of the reflector. Hence, the system avoids droop in the two-dimensional scan pattern that tends to arise when the angle of incidence of the laser beam is non-orthogonal to the reflective surface.

Another feature of FIG. 5 resides in the folded optical path or "retro" configuration shown wherein the laser beam source 182 is off axis from that of the beam directed from the reflector 180 to the target. The field of view of the detector 186 follows the optical path to the target by way of collector 184. The folded path configuration shown is made possible by the opening 181 in the collector. The retro-configuration enables the scanning mechanism to be considerably more compact than heretofore possible.

FIGS. 1 to 4 illustrate a preferred scan module within which the scanning arrangement of FIGS. 5 and 6 is incorporated. Parts of the module already described with reference to FIGS. 5 and 6 are given the same reference numerals.

Figure 1:
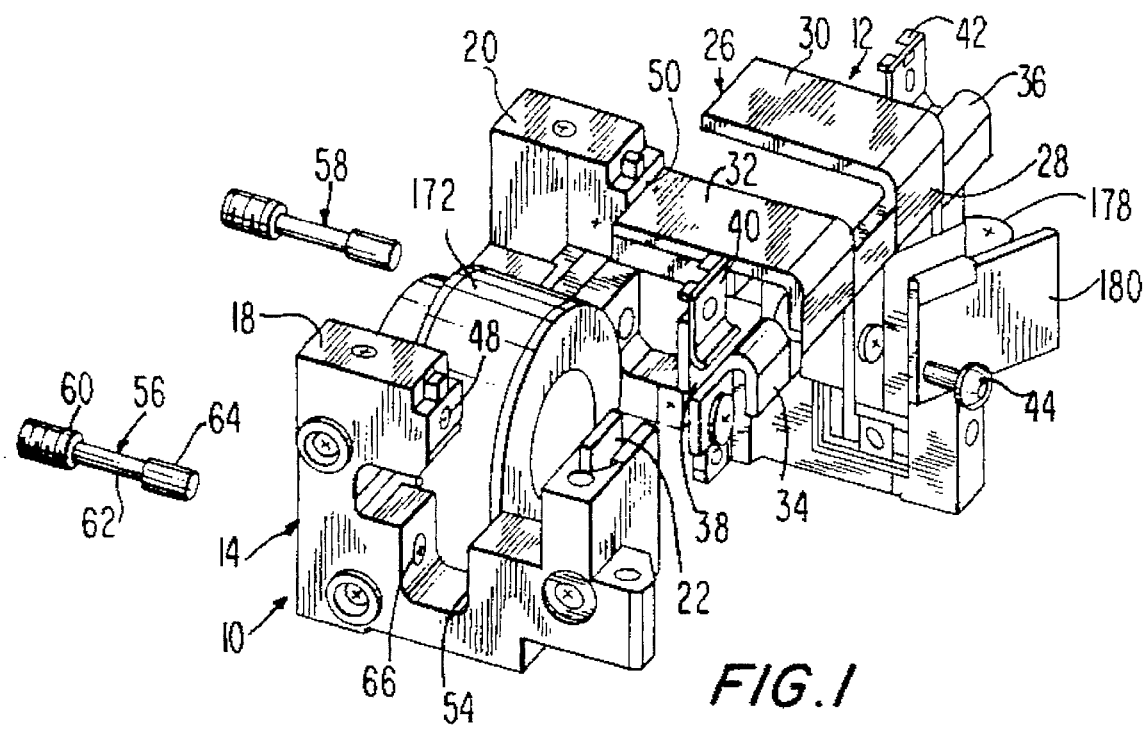
FIG. 1 is an exploded perspective view of a scan module to be mounted in a scanner with the aid of a mounting arrangement in accordance with this invention.

As may best be seen in the exploded view of FIG. 1, the scan module consists of two separate sections: a chassis element 10 and a scan element 12. In FIG. 1, these two sections are shown in exploded form, prior to their securement together during the assembly process.

Figure 3:
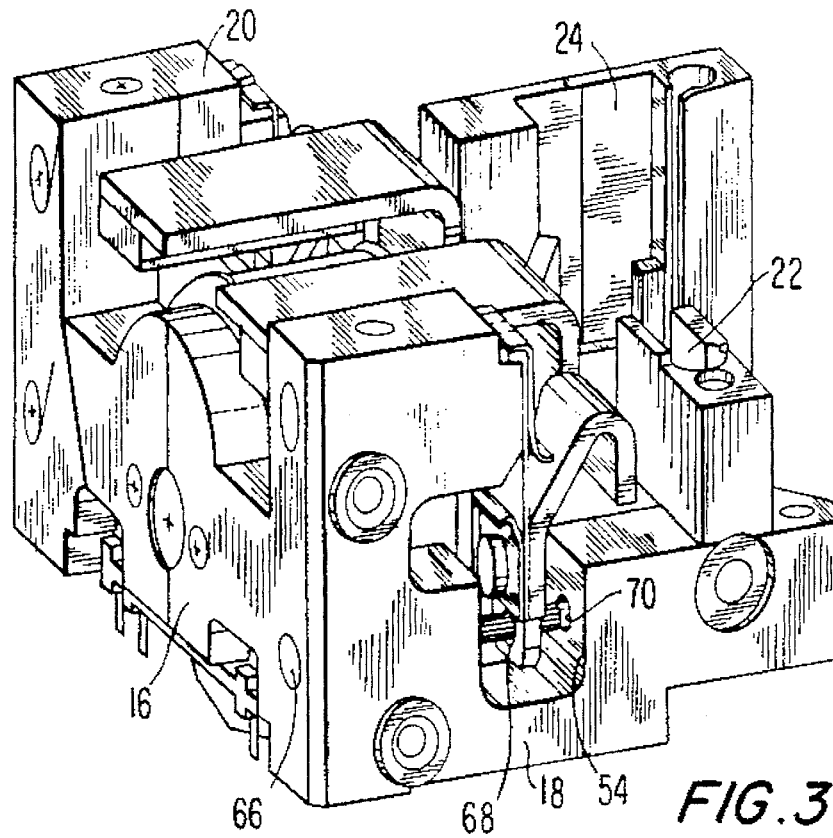
FIG. 3 is a view analogous to FIG. 2.

As is best seen in FIGS. 3 and 4, the chassis element 10 comprises a chassis 14 which carries the coil 172. The coil 172 is secured to a rear wall 16 of the chassis. At respective ends of the rear wall, there are first and second forwardly-extending side supports 18, 20. The forward end of the side support 18 is provided with a vertical slot 22 (FIG. 3) into which the collecting mirror 184 (FIG. 4) is placed. The forward part of the other side support 20 is provided with a larger vertical slot or cavity 24 (FIG. 3) into which the photodiode assembly 186 (FIG. 4) fits.

Figure 2:
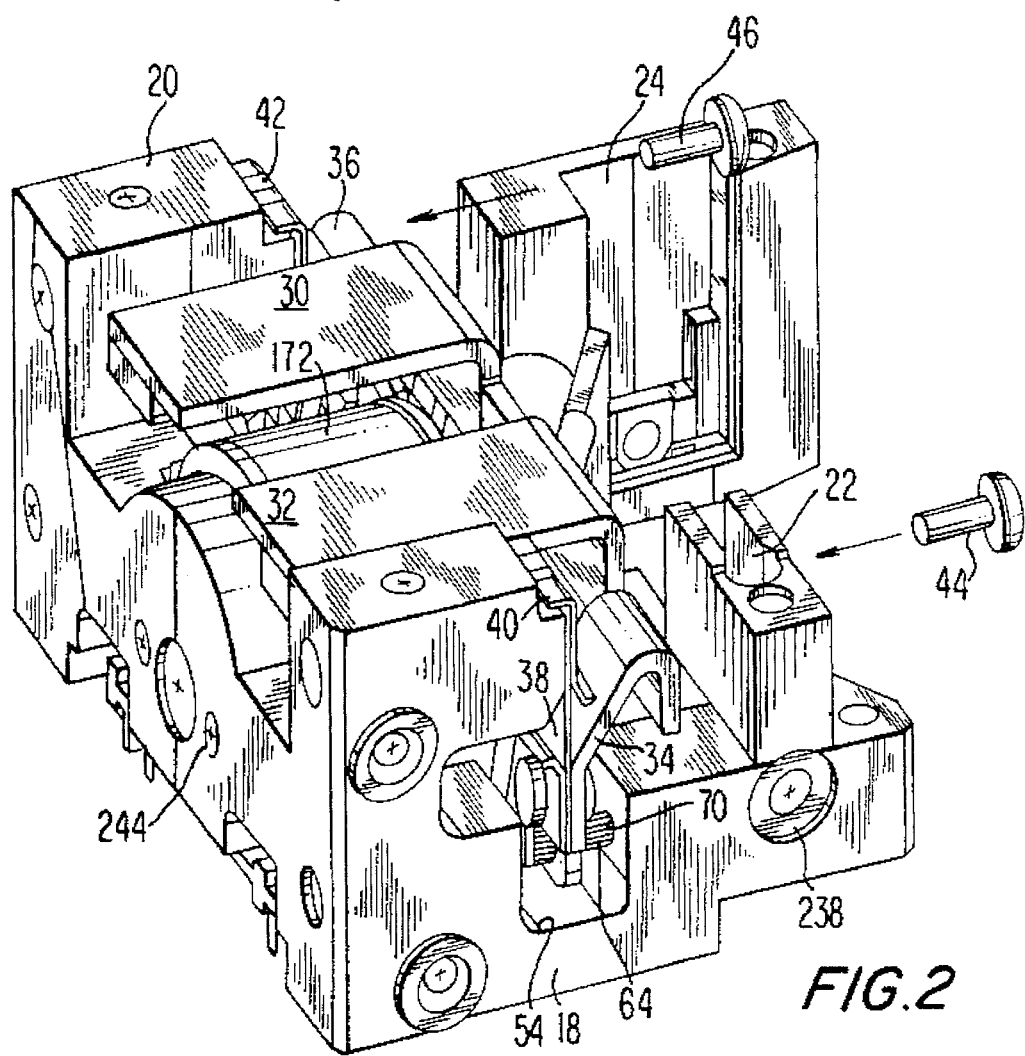
FIG. 2 is a partially assembled view of the scan module of FIG. 1.

The features of the scan element 12 (which is during assembly secured to the chassis element 10) is best seen from a comparison of FIGS. 1, 2 and 4. The scan element comprises a beryllium-copper bracket generally shown at 26 having a vertical mounting portion 28 in a plane perpendicular to the axis of the coil 172. The upper part of the mounting portion is formed with two rearwardly-pointing prongs 30, 32 (not visible in FIG. 4). Secured to the mounting portion 28 is the spring 178, previously mentioned with reference to FIG. 5, which carries the reflector 180. On either side of the springs 30, 32, the upper edge of the mounting portion 28 is bent backwardly to form first and second hanging brackets (34, 36, best seen in FIGS. 1 and 2). Screwed to these hanging brackets are respective first and second sheets of Mylar film 36, 38, only one of which is visible in FIGS. 1 to 3. At the top of the Mylar sheets are secured respective hangers 40, 42.

The scan module is assembled by bringing the scan element 12 up to the chassis element 10 and using screws 44, 46 to attach the hangers 40, 42 to respective bosses 48, 50 on the chassis side supports 18, 20. The relative positioning of the chassis element and the scan element, just prior to their securement together by the screws 44, 46 is shown most clearly in FIG. 2.

It will be appreciated that once the scan module has been assembled, as described, the entire weight of the scan element, including the reflector 180, is supported by the hangers 40, 42 and the sheets of Mylar film 36, 38. The entire scan element is accordingly free to rock back and forth about a horizontal axis perpendicular to the axis of the coil 172 as the Mylar films flex.

The operation of the scan module will now be described, with reference to FIG. 4. A laser beam, emanating from the laser beam source and lens assembly 172, passes through the hole 181 in the collector 184, and impinges upon the reflector 180 from which it is reflected via a window 52 to a bar code symbol to be read (not shown). Energization of the coil 172 causes oscillation of the reflector 180 in two directions: a first direction due to flexing of the spring 178 and a second direction due to flexing of the Mylar film. By appropriate control of the coil, a variety of scanning patterns can be produced, for example, a raster pattern or other types of two-dimensional patterns.

Light reflected back from the bar code symbol passes back through the window 52, impinges on the reflector 180, and is reflected to the collector 184. The collector concentrates the light and reflects it back to the photo-detector 186. Decoding circuitry and/or a microprocessor (not shown) then decode the signals received by the photo-detector 186, to determine the data represented by the bar code symbol.

Since the entire weight of the scan element 12 is supported by the Mylar film, the film is likely to be very vulnerable to shocks, fox example, if the user accidentally knocks or even drops the scanner within which the scan module is contained. To protect the film, as shown in FIGS. 2 and 3, the lower end of the hanging bracket 34 is located within a channel 54 formed in the side support 18 of the chassis. As the film flexes, the hanging bracket 34 moves back and forth within the channel 54. The Mylar film is prevented from over-flexing by the walls of the channel 54 which act as stops. A similar arrangement (not visible in the drawings) is provided on the other side.

A second level of film protection is provided by alignment pins 56, 58, best seen in FIG. 1. Each pin comprises a threaded rear head portion 60, a reduced diameter smooth waist portion 62, and a smooth forward head portion 64.

In its operational position, shown in FIG. 3, the waist portion 62 of the pin passes through a hole 68 in the hanging bracket 34, with the forward head portion 64 being received within a correspondingly-sized blind bore 70 within one side of the channel 54. The rear head portion 60 of the pin is screwed into and held in place by a threaded bore 66 which opens at its forward end into the channel 54 and at its rearward end into the rear surface of the rear wall 16. There is a similar arrangement on the other side (not shown) for the second alignment pin 58.

The diameter of the waist portion 62 of the pin is some 0.02 inches smaller than the diameter of the hole 68 in the hanging bracket. This provides sufficient tolerance for the Mylar film to flex slightly during normal operation. However, if the module is dropped, the presence of the pin prevents over-stressing and perhaps tearing of the Mylar film.

The alignment pins have a further function of assisting accurate positioning of the scan element 12 with respect to the chassis during assembly. During assembly, the scan element is brought tip into approximately the correct position, and the alignment pins are then inserted as shown in FIG. 2. At this point, the forward head portion 64 is a tight tolerance sliding fit both within the hole 68 in the hanging bracket and in the blind bore 70. This aligns file scan element to the pins and, hence, to the chassis. The scan element is then secured to the chassis, as previously described, using the screws 44, 46. The hangers 40, 42 provide a certain amount of adjustability or tolerance in positioning, thereby ensuring that the scan element can be attached to the chassis at the position defined by the alignment pins. The pins are then fully screwed into the threaded bores 66 until the end of the pin is flush with the rear face 16 of the chassis. At this point, as is shown in FIG. 3, the forward head portion of the pin has been received within the bore 70, and the waist portion has moved up to its final position within the hole 68 of the hanging bracket.

Turning now to FIGS. 7 and 8, the scan module of FIGS. 1–4 is mounted within an electro-optical scanner for reading coded indicia. The illustrated scanner is a hand-held, gun-shaped instrument having a handle 200 and a housing having an upper shell 202 and a lower shell 204. A front window 206 is mounted between the shells forwardly of the housing. A manually-actuated trigger 208 on the handle below the lower shell is depressed by a user's forefinger to energize the scan module and initiate reading. Other scanners, both hand-held or stationary, could be employed.

As described above, during operation of the scan module, the reflector 180 is repeatedly oscillating; the springs 176 and 178 are repeatedly being flexed; and the magnet 174 is repeatedly entering and exiting the electromagnetic coil. All this movement creates the aforementioned, high frequency (on the order of 280 Hz), undesirable vibrations which, if not dampened, would be propagated from the scan module outwardly to the housing and the handle, thereby rendering the vibrating instrument uncomfortable to hold. Also, as previously described, external shocks applied to the exterior of the scanner must be prevented from reaching the scan module and possibly tearing the Mylar film or misaligning the optical components.

In accordance with this invention, a shock-resistant, vibration-isolated arrangement 210 is used to mount the scan module in the scanner. In the preferred embodiment, a flexible printed circuit board 212 having electrical components thereon is assembled over two sides of the scan module for a compact construction. Note that the orientation of the scan module in FIGS. 7 and 8 is upside down as compared to its orientation illustrated in FIGS. 1–4. Using the orientation shown in FIGS. 7 and 8, the board 212 has a top part 212a which extends over the top of the module, and a side part 212b (see FIG. 8) which extend over one side of the module. The board 212 is secured in place by threaded fasteners. The resultant assembly of the board 212 on the scan module is identified by the reference numeral 214.

The arrangement 210 includes a generally U-shaped frame having a pair of generally parallel side walls 216, 218 spaced apart along a transverse direction, and a rear wall 220 extending between the side walls along the transverse direction. Side walls 216, 218 have co-linear passages 216a, 218a extending therethrough along the transverse direction. Rear wall 220 has a passage 220a extending therethrough. Side walls 216, 218 extend along a longitudinal direction normal to the transverse direction, and have front flanges 220, 222. Rear wall 220 has rear flanges 224, 226 extending in the opposite longitudinal direction away from the rear wall. The frame is preferably molded of synthetic plastic material. All the walls and flanges are of one-piece construction.

Isolation mounts extend through each wall to support the module 214. Tubular sleeves 230, 232 of elastomeric material are mounted in passages 216a, 218a. Threaded fasteners 234, 236 extend through the sleeves 230, 232 and threadedly engage co-linear threaded bores 238 (only one shown in FIG. 2) in the sides of the module. Another tubular sleeve 240 of elastomeric material is mounted in passage 220a, and a threaded fastener 242 extends through sleeve 240 and threadedly engages a threaded bore 244 (see FIG. 2) in the rear of the module.

As described so far, the scan module 214 is a rigid body mass which vibrates its operational mode, and is supported at three points arranged about its center of gravity. The elastomeric sleeves 230, 232, 240, preferably constituted of a silicone sponge rubber so as to have a "soft" elastomeric characteristic, serve as soft springs for connecting the scan module 214 to another rigid body mass, namely the U-shaped frame 216, 218, 220. These soft springs attenuate the high frequency vibrations and resist them from being propagated outwardly to the housing.

A pair of front shock absorbers or bumpers 246, 248 are slipped over and frictionally held on the front flanges 220, 222. Another pair of rear shock absorbers or bumpers 250, 252 are slipped over and frictionally held on the rear flanges 224, 226. Each bumper has an internal channel into which the respective flange is inserted. The bumpers are positioned at the corner regions of the module and have outer surfaces which bear against the interior walls of the housing shells 202, 204. Pairs of upright front and rear fins 254, 256 bear against the respective bumpers and securely hold them in place. The bumpers are constituted of an elastomeric, and rubber material, e.g., santoprene, and act as stiff springs to absorb at least a major portion of the energy of a sharp impact to the housing.

The mounting arrangement 210, thus shock-protected and vibration-isolated, can be used as a support for additional printed circuit boards and their electrical components, thereby rendering a very compact assembly. Thus, a printed circuit board 260 having clearance holes 262, 264 is mounted onto posts 266, 268 extending outwardly of the side wall 216 of the frame. Threaded fasteners 270, 272 extend through the holes and threadedly engage bores in the posts. Another printed circuit board 274 having electrical components thereon, for example, a microprocessor 276, is likewise threadedly fastened with the aid of fasteners 278, 280 which extend through clearance holes in the board 274 to threadedly engage threaded bores formed in additional posts 282, 284 at upper regions of the frame. Flexible ribbon cables 290, 292 are employed to electrically connect the components on board 274 with the other electrical components in the scanner.

It will be understood that each of the elements described above, or two or more together, also may find a useful application in other types of constructions differing from the types described above.

While the invention has been illustrated and described as embodied in a vibration-and shock-resistant scan module for electro-optical scanners, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. A mounting arrangement in a system for reading indicia, comprising:
   a) a housing having housing parts spaced apart from each other;
   b) a frame within the housing between the housing parts, and having frame walls spaced away from the housing parts;
   c) a scan module within the frame between the frame walls, and having a support spaced away from the frame walls, and a scan element mounted on the support for oscillating movement with concomitant generation of internal vibrations;
   d) means extending between the support and the frame for vibration isolating the scan module from the frame to resist transmission of the vibrations from the scan module to the frame; and
   e) means extending between the housing and the frame for shock mounting the frame from the housing to resist transmission of external shocks from the housing to the frame.

2. The arrangement as claimed in claim 1, wherein the frame walls are side walls spaced apart of each other along a transverse direction, and a rear wall extending between the side walls along the transverse direction; and wherein the isolating means includes a plurality of isolation mounts spaced apart of one another and extending through the side and rear walls.

3. The arrangement as claimed in claim 2, wherein each side and rear wall has a passage extending therethrough; and wherein each isolation mount includes an elastomeric sleeve in a respective passage, and an elongated fastener extending through the sleeve and the passage to the scan module.

4. The arrangement as claimed in claim 2, wherein the isolation mounts on the side walls are co-linear along the transverse direction.

5. The arrangement as claimed in claim 3, wherein each sleeve is a hollow tube of sponge rubber material.

6. The arrangement as claimed in claim 1, wherein the frame walls are side walls spaced apart of each other along a transverse direction, and a rear wall extending between the side walls along the transverse direction; and wherein the shock mounting means includes a plurality of bumpers spaced apart of one another and exteriorly mounted on the side and rear walls.

7. The arrangement as claimed in claim 6, wherein each bumper is a block of elastomeric material.

8. The arrangement as claimed in claim 1, wherein the shock mounting means includes a plurality of bumpers mounted exteriorly of the frame, each bumper being constituted of an elastomeric material having a predetermined elastomeric characteristic; and wherein the isolating means includes a plurality of elastomeric sleeves extending through the frame, each sleeve being constituted of an elastomeric material having an elastomeric characteristic less than said predetermined characteristic.

9. The arrangement as claimed in claim 1, wherein the frame walls are side walls spaced apart of each other along a transverse direction, and a rear wall extending between the side walls along the transverse direction; and wherein the frame has means for securing a generally planar, printed circuit board in an overlying relationship with the side and rear walls above the frame.

10. The arrangement as claimed in claim 9; and wherein the frame has means for fixing another generally planar, printed circuit board in an overlying, generally parallel relationship with one of the side walls.

11. The arrangement as claimed in claim 1, wherein the housing includes a handle, and means bounding an interior for accommodating the frame and the scan module.

12. The arrangement as claimed in claim 11, wherein the bounding means includes an upper housing part and a lower housing part between which the frame and the scan module are accommodated.

13. The arrangement as claimed in claim 12, wherein the housing includes a window secured between the upper and lower housing parts, said window being in an optical path along which at least one of a light beam generated by the scan module is directed, and a field of view of the scan module is scanned.

14. The arrangement as claimed in claim 11, wherein the housing includes a manually-actuated trigger operative, when actuated, to energize the scan module.

15. The arrangement as claimed in claim 1, wherein the shock mounting means includes a plurality of bumpers spaced apart of one another and exteriorly mounted on the frame, and wherein the housing has means bearing against the bumpers to hold the bumpers, the frame and the scan module in place within the housing.

16. A method of mounting a scan module in a system for reading indicia, comprising the steps of:
   a) supporting a frame within a housing so that frame walls of the frame are located between, and are spaced away from, housing parts of the housing;
   b) supporting a scan module within the frame between the frame walls;
   c) mounting a scan element on a support of the scan module for oscillating movement with concomitant generation of internal vibrations, and mounting the support between the frame walls;
   d) vibration isolating the scan module from the frame to resist transmission of the vibrations from the scan module to the frame; and
   e) shock mounting the frame from the housing to resist transmission of external shocks from the housing to the frame.

17. The method as claimed in claim 16, wherein the shock mounting step is performed by mounting a plurality of bumpers exteriorly of the frame.

18. The method as claimed in claim 16, wherein the isolating step is performed by mounting a plurality of isolation mounts on the frame.

19. The method as claimed in claim 17, wherein the housing has an upper housing part separatable from a lower housing part to which a handle is secured, and wherein the shock mounting step is performed by separating the housing parts prior to performing the shock mounting step.

20. The method as claimed in claim 19, wherein the shock mounting step is performed by forming holders on the housing parts, and by positioning the bumpers to bear against the holders.

21. The method as claimed in claim 18, wherein the isolating step is performed by forming a plurality of passages through the frame, by positioning elastomeric sleeves in the passages, and by securing fasteners through the sleeves to the scan module.

22. The method as claimed in claim 16, wherein the shock mounting step is performed by mounting a plurality of bumpers, each having a stiff spring characteristic, exteriorly of the frame; and wherein the isolating step is performed by mounting a plurality of isolation mounts, each having a soft spring characteristic, on the frame.

* * * * *